United States Patent [19]

Fongen

[11] Patent Number: 5,277,760
[45] Date of Patent: Jan. 11, 1994

[54] PROCESS FOR THE MANUFACTURE OF PULP FOR PAPER, AND FIBERBOARD PRODUCTS USING ALKALINE COOKING CHEMICAL AND OXYGEN IN A CLOSED, CONTINUOUS AND PRESSURIZED TUBE SYSTEM

[76] Inventor: Sigurd Fongen, Beiteveien 25, Moss N-1500, Norway

[21] Appl. No.: 623,801

[22] PCT Filed: May 25, 1989

[86] PCT No.: PCT/NO89/00051
§ 371 Date: Dec. 21, 1990
§ 102(e) Date: Dec. 21, 1990

[87] PCT Pub. No.: WO89/12716
PCT Pub. Date: Dec. 28, 1989

[30] Foreign Application Priority Data

Jun. 24, 1988 [NO] Norway ............... 882815

[51] Int. Cl.⁵ .......... D21C 3/02; D21C 3/26; D21C 9/16
[52] U.S. Cl. .......................... 162/6; 162/19; 162/24; 162/40; 162/52; 162/56; 162/65
[58] Field of Search .......... 162/4, 6, 18, 19, 22, 162/52, 65, 90, 56, 60, 251, 237, 246, 243, 241, 37, 39, 40, 24

[56] References Cited

U.S. PATENT DOCUMENTS

| | | | |
|---|---|---|---|
| 1,679,336 | 7/1928 | Dunbar | 162/19 |
| 4,248,662 | 2/1981 | Wallick | 162/65 |
| 4,259,150 | 3/1981 | Prough | 162/60 |
| 4,416,727 | 11/1983 | Elton et al. | 162/65 |

FOREIGN PATENT DOCUMENTS 415202 9/1980 Sweden .

*Primary Examiner*—Steve Alvo
*Attorney, Agent, or Firm*—Kane Dalsimer Sullivan Kurucz Levy Eisele & Richard

[57] ABSTRACT

Process for producing pulp suitable as raw material for paper, board or fiberboards and similar products. A pumpable alkaline slurry of fibrous raw material is conducted through a pressurized tube system by the use of pulp pumps, the pressure increasing in steps from the beginning of the process to the end of the process. On its way the slurry is repeatedly dewatered and rediluted with process liquid. An apparatus suitable for being used in carrying out the process comprises a dewatering tube (64) and a dewatering and venting tube (67) arranged centrally and axially within the tube (64) which may be provided with a perforated part (66). The tube (67) is provided with perforations (68) through which gas and liquid from fiber-containing slurry introduced into the outer tube (64) can escape. At the opposite end from the inlet end of the outer tube (64) there is an outlet (72, 65) for thickened fiber-containing slurry.

9 Claims, 6 Drawing Sheets

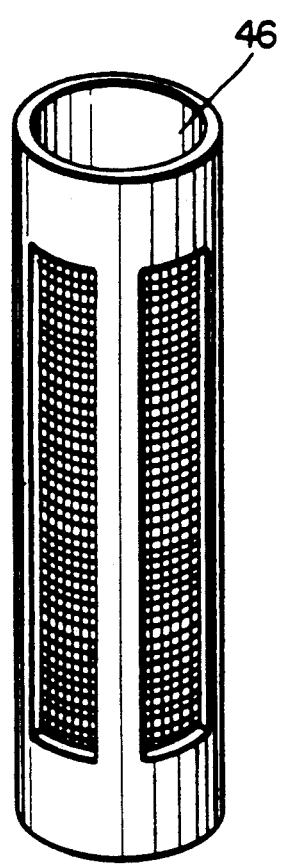
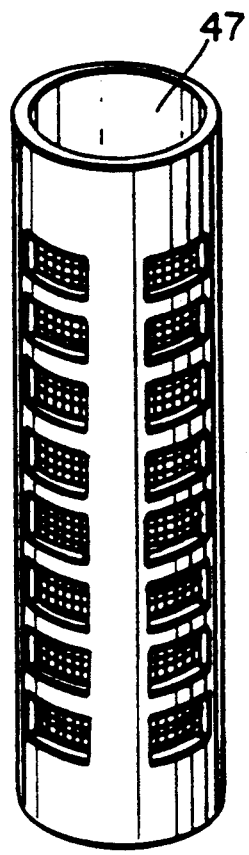
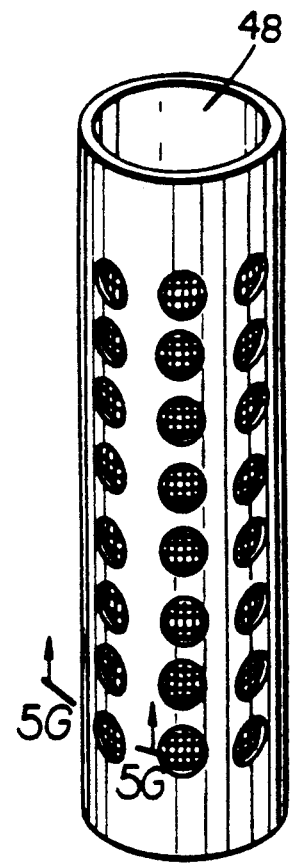
FIG. 5A      FIG. 5B      FIG. 5C
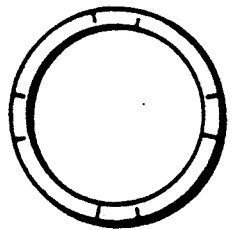
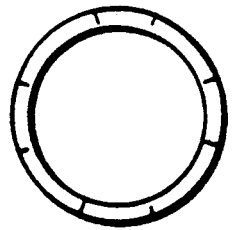
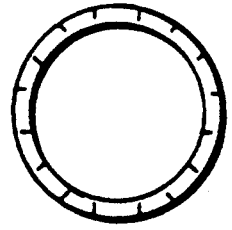
FIG. 5D      FIG. 5E      FIG. 5F ize = 5,277,760

PROCESS FOR THE MANUFACTURE OF PULP FOR PAPER, AND FIBERBOARD PRODUCTS USING ALKALINE COOKING CHEMICAL AND OXYGEN IN A CLOSED, CONTINUOUS AND PRESSURIZED TUBE SYSTEM

FIELD OF THE INVENTION

The present invention relates to continuous production of pulp by means of a combined chemical and mechanical method for digesting plant and wood fibers to pulp to be used as raw material for paper, board, fiberboards and other fiber-containing products. The present process is also well suited for de-inking and washing of cellulose fibers, delignification and, optionally, bleaching of secondary fibers.

THE PRIOR ART

Pulp has for several decades been produced by means of the well known sulphite or sulphate processes. Both processes today require very large plants to enable them to be carried out economically, and it is highly expensive to build new cellulose mills for the production of pulp by means of these processes. Nevertheless, in the recent years some new large cellulose mills have been built in the developed countries of the world, and after starting up, these cellulose mills have suffered heavy economic losses.

In international application PCT/NO88/00011 filed on Feb. 11, 1988 with claim to priority inter alia from Norwegian Patent Application No. 870562 filed on Feb. 12, 1987 a process for digesting plant and wood fibers and/or for delignification, optionally with preceding deinking, of secondary fibers, possibly with subsequent bleaching, with obtainment of a pulp which is suited as raw material for paper, board, fiber boards and paper products which contain plant and/or wood fibers has been disclosed and claimed. The fibrous raw material is introduced into a digesting zone and is digested therein in alkaline slurry at elevated temperature and pressure using an alkaline cooking chemical in combination with oxygen and, optionally, minor amounts of other additives, like e.g. anthraquinone. The cooking chemicals are removed from the digesting process in the form of a black liquor which is deposited or subjected to recovery of chemicals. The process according to the abovementioned international application is characterized in that pulp and chemical substances during the digestion and the optional bleaching are transported in the form of a pumpable slurry through a closed, continuous and pressurized tube system by the use of pulp pumps which are simultaneously used as mixing aggregates for the slurry and the chemicals. While transporting the pulp slurry through the tube system the pulp slurry is repeatedly subjected to dewatering steps by pressing out liquid from the pulp slurry, and prior to each dewatering step of the process, the pulp is diluted with pressed out process liquid returned from a downstream dewatering step of the process and/or from a downstream pumping step of the process. While being transported through the tube system, the pulp is subjected to stepwise in the pumping steps, and prior to the last dewatering step the pulp is diluted and, optionally, cooled with fresh water and/or bleaching liquor supplied under pressure. After the last dewatering step of the pressurized digestion or delignification system the pulp is washed and optionally bleached in a continuation of the pressurized system or in the non-pressurized state after cold or hot blowing from the pressurized system.

OBJECTS OF THE INVENTION

It is an object of the invention to provide a process for the production of pulp which is suited as raw material, for paper, board, fiberboard and other products which contain plant and/or wood fibers. The present process is to be carried out at stepwise increasing pressure in a closed, pressurized tube system comprising several pressure steps in succession while using several circulation circuits for the pulp suspension at the different pressure steps with the object of improving the transfer of thickened pulp from one pressure step into the next (higher) pressure step in order to secure improved pulp flow through the process system compared with the transfer of thickened pulp disclosed in said international application PCT/NO88/00011. Likewise, it is also an object of the invention to enhance the turbulence of the fiber suspension thereby promoting the speed of reaction between fibers and process liquid, i.e. obtaining increased "washing machine effect" compared with the effect obtained by the process according to said international application.

SUMMARY OF THE INVENTION

Thus, the invention relates to a process for digesting and, optionally, bleaching of plant and wood fibers, and/or for delignification and, optionally, deinking of secondary fibers, with the obtainment of a pulp which is suited as raw material for paper, board, fiberboards and other products which contain plant and/or wood fibers, wherein fibrous raw material is introduced into a digestion zone and is digested therein in alkaline slurry at elevated temperature and pressure using an alkaline cooking chemical in combination with oxygen and, optionally, minor amounts of other additives, like e.g. anthraquinone, and wherein the cooking chemicals are removed from the digesting process in the form of a black liquor which is deposited or subjected to recovery of chemicals therefrom, wherein the fibrous raw material in the form of a pumpable a slurry during the digestion and the optional bleaching is conducted through a closed, continuous and pressurized tube system by the use of pulp pumps which simultaneously are used as mixing aggregates for the slurry and the chemicals, and while being conducted through the tube system the pulp is subjected to repeated dewaterings by pressing out liquid from the pulp slurry and prior to each dewatering, apart from the last dewatering of the process, the pulp is diluted with pressed out process liquid returned from a downstream dewatering step of the process and/or from a downstream pumping step of the process, and while being conducted through the tube system the pulp is subjected to stepwise increasing pressure in three or more pumping steps and prior to the last dewatering step of the process is diluted and, optionally, cooled with fresh water and/or bleaching liquor supplied under pressure, and after the last dewatering step of the pressurized tube system the pulp is washed and, optionally, bleached in a continuation of the pressurized system or in the non-pressurized state upon cold or hot blowing from the pressurized system, and wherein at least at each pressure step intermediate the first and last pressure step two circulation circuits are maintained which circulate through the same circulation pump, whereby one of the circulation circuits is comprised mainly by fiber suspension in circulation and the other circulation circuit is comprised mainly by process liquid pressed out of the pulp suspension in a downstream pulp dewatering-thickening means and recycled therefrom to the suction side of said circulation pump and at said suction side being admixed with fiber suspension circulated in said one circulation circuit.

The invention also relates to a means for continuous dewatering of low consistency fiber suspension within the pressurized tube system used in carrying out the present process, and for degassing and thickening of fiber suspensions when carrying out the present process, comprising a perforated dewatering tube designed as a perforated hydrocyclone and with an enclosing jacket arranged around the dewatering tube, means for introducing pulp suspension into the perforated dewatering tube at one end thereof, a smaller dewatering and venting tube arranged centrally and axially within the perforated dewatering tube, the dewatering and venting tube together with the perforated dewatering tube yielding a combined effect consisting of concurrent dewatering of the fiber suspension through the perforations in the perforated dewatering tube into which the fiber suspension is introduced, separation of gas and liquid from the fiber suspension within the perforated dewatering tube through perforations in the smaller centrally and axially arranged dewatering and venting tube with withdrawal of the gas from within the smaller dewatering and venting tube, and cleaning of the perforated outer face of the smaller dewatering and venting tube and of the perforations of the inner face of the perforated outer dewatering tube by means of continuous flushing thereof with the fiber suspension, and an outlet for thickened fiber suspension at the end opposite to the inlet end of the outer dewatering tube.

BRIEF DESCRIPTION OF THE DRAWINGS

In the drawings

FIGS. 5A, 5B and 5C shows three examples of tube perforations used for the pressurized dewatering means according to the invention.

FIGS. 5D, 5E and 5F are a cross sectional view of the walls of the view shown in FIGS. 5A, 5B and 5C, respectively.

DETAILED DESCRIPTION OF THE DRAWINGS WITH PERTAINING DESCRIPTION OF THE CARRYING OUT OF THE PRESENT PROCESS WITH BEST EMBODIMENT

Figure 1:
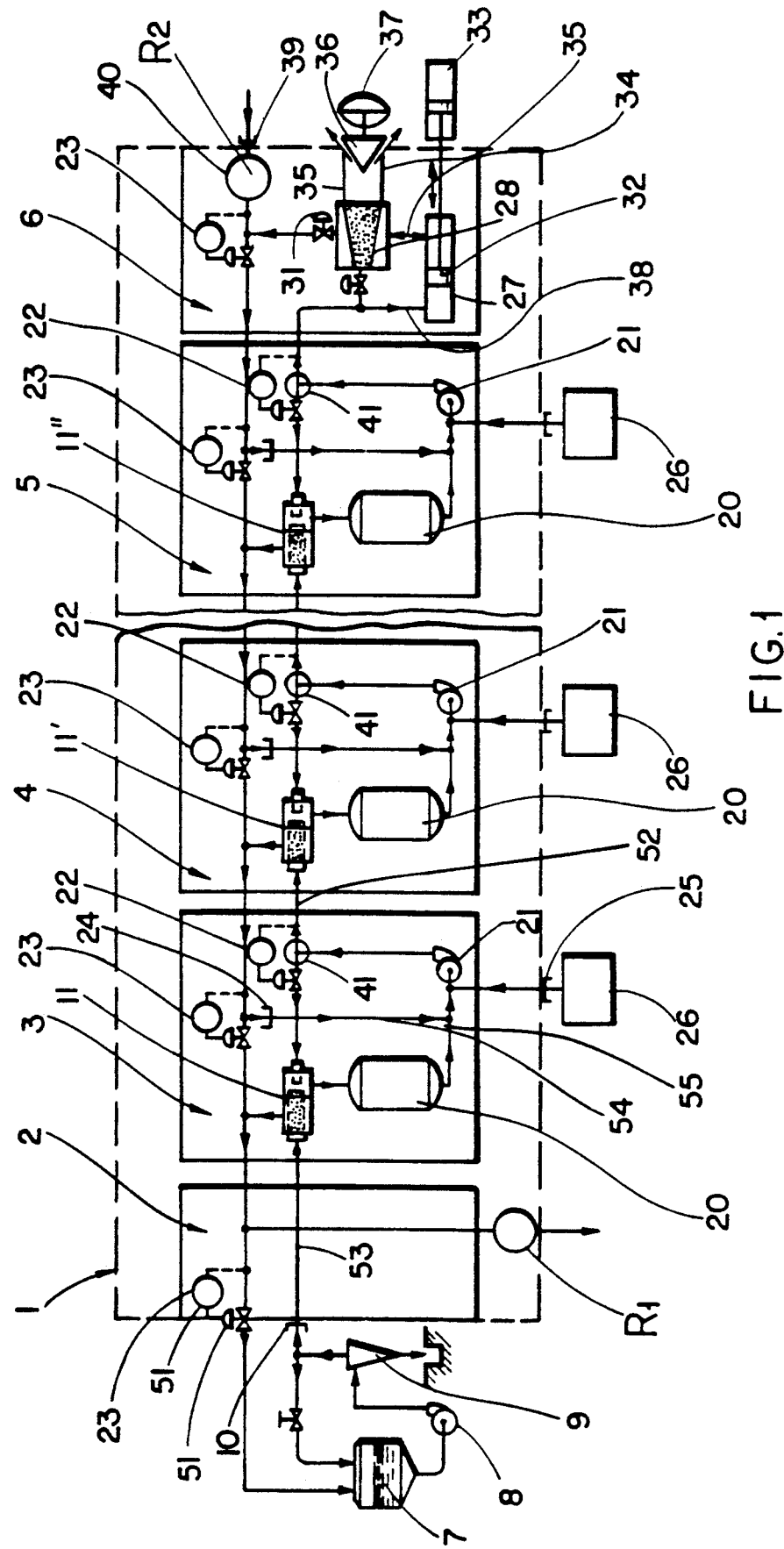
FIG. 1 shows an example of the mechanical building up of the system for carrying out the present process, the system consisting of a closed, pressurized tube system which internally has been divided into several, partly identical, pressure steps with the pressure levels increasing from left to right in the Figure.

FIG. 1 shows an example of a mechanical building up of the process system used in carrying out the present process, in the form of a closed, pressurized tube system 1 which internally has been divided into several, partly identical, pressure steps, exemplified in the drawing by means of the reference numerals 2, 3, 4, 5 and 6, with increasing pressure levels from 2 to 6.

To this closed pressurized tube system fiber raw material is supplied from a pulper 7, the fiber raw material from the pulper being fed into the pressurized tube system through a pump 8, a cleaning means 9 for fiber suspension and a check valve 10. The pump 8 is a pulp pump of conventional construction and sets the fiber suspension coming from the pulper 7 under pressure corresponding to the pressure level in pressure step 2.

Figure 2:
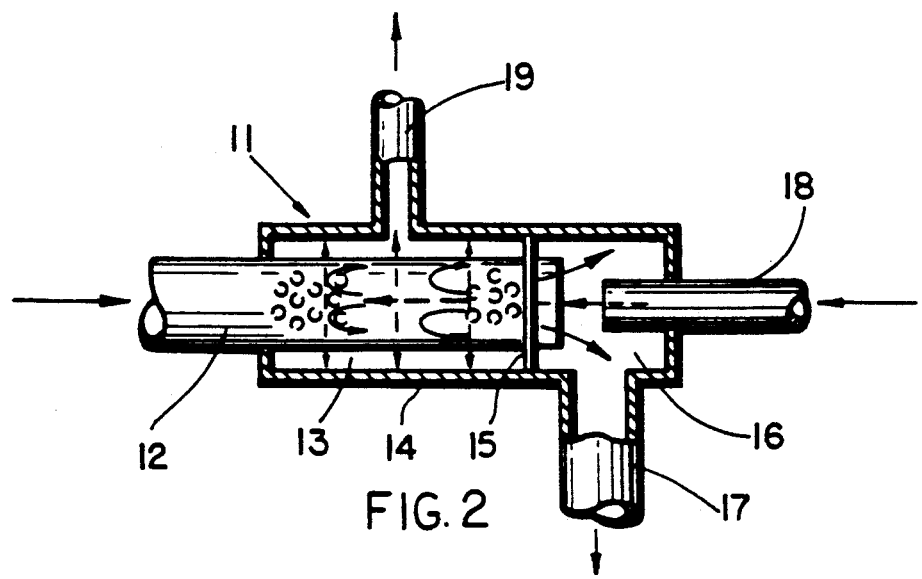
FIG. 2 shows a dewatering means for use in carrying out the present process.

In the transition between pressure step 2 and pressure step 3 a dewatering means 11 is arranged which has been shown in more details in FIG. 2 and which receives fiber suspension through the tube 53 from the check valve 10. The dewatering means 11 consists of a tubular inlet 12 into which fiber suspension is introduced through the tube 53 from the check valve 10. The tubular inlet 12 continues as a tubular, perforated dewatering member 13 with a surrounding chamber 14 which by means of a tight partition wall 15 is separated from a flushing chamber 16 which is provided with an outlet 17 for fiber suspension. Into the dewatering member 13 fiber suspension is pumped in through a tube 18 (flushing tube). The dewatering means is provided with an outlet 19 for process liquid which has been pressed out through the perforations in the dewatering member 13. The flushing tube 18 has smaller diameter than the dewatering member or tube 17.

Moreover, each separate pressure step, apart from pressure steps 2 and 6, consists, as shown in FIG. 1, of a container 20, a pump 21, overflow or reducing valves (PIC valves) 22 and 23 and a check valve 24. At the suction side of the pump 21 heat (steam) and chemicals for the digestion or delignification process are supplied from a supply means 26 through a check valve 25.

The last pressure step 6 features a dewatering means which discharges thickened pulp in the form of a pulp plug out of the pressurized system. The construction of the dewatering means appears from FIG. 3. It consists of a conically shaped dewatering tube 28 which is located within a chamber 29. Upon closing the two valves 30 and 31 a hydraulic piston 32, which is operated by means of an external activating member 33, will upon movement towards the right hand side of FIG. 3 press process liquor through the communicating tube 34 and into the chamber 29 and through the perforations in the conical tube 28 and cause partial pressing out of the conical pulp plug formed within the dewatering tube 28, through a tube 35 and past a discharge member 36 which is pressure controlled by a controllable pressure device 37, e.g. an air bellows.

A communicating tube 38 between the pulp system and the hydraulic piston 32 facilitates the pressing out of the plug from the system. The tube 28 can have the same type of perforation as shown in FIG. 5 for the dewatering means 11.

Fresh water is pressed into the process system through a check valve 39 (FIG. 1) and the amount of the fresh water introduced into the process system is controlled by means of a regulator $R_2$ 40.

Figure 4:
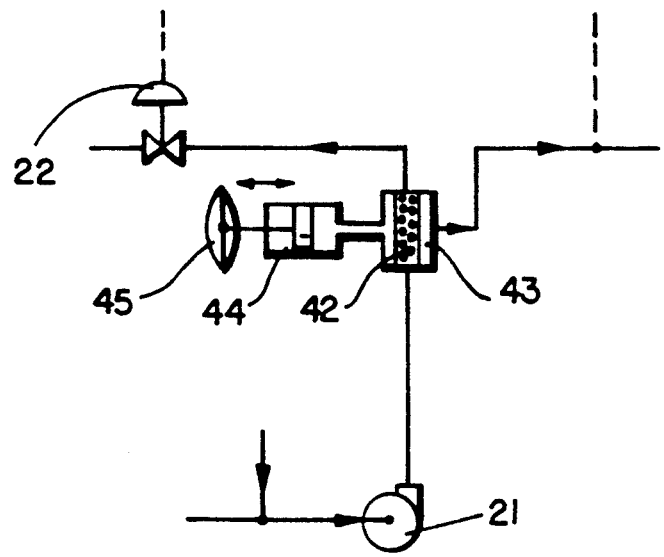
FIG. 4 shows an internal fiber sorting means which can be included in the system for carrying out the present process.

A junction 41 which if desired may comprise a simple internal fiber sorting means is provided in the pressurized tube system in which the present process is carried out, as shown in FIG. 1. The mode of operation of the optional fiber sorting means 41 appears from FIG. 4. The fiber sorting means 41 includes a perforated tube 42 surrounded by a chamber 43 which communicates with an hydraulic cylinder 44 which in response to the movements of an actuator 45 which is pressure controlled, causes a reciprocating movement of the pulp suspension through the perforations in the tube 42 when pumping the pulp suspension by means of the pump 21 into the tube 42. Suspension containing the coarser fiber fraction will be kept back by the perforations in the tube 42 and will be returned to the main circulation circuit of the pertaining pressure step, whereas suspension containing the finer fiber fraction will be passed on from the chamber 43 and to the next dewatering means 11' (FIG. 1) through a branch tube 52. In the dewatering means 11' suspension liquid is pressed out and is returned for circulation in pressure step 3, through the check valve 24 to the suction side of the pump 21 through a communicating tube 54 between the check valve 24 and a communicating tube 55 which leads from the tank 20 to the pump 21. Thus, by means of the same circulation pump 21 two circulation circuits are maintained in pressure step 3, i.e. circulation of fiber suspension which comes from the dewatering means 11 and which is passed through the container 20, through the tube 55 between the container 20 and the pump 21, and then into the pump 21 and from the pump 21 to the junction or fiber sorting means 41 and thence through the reducing valve or overflow valve (PIC valve) 22 back into the dewatering member 13 (FIG. 2) of the dewatering means 11. In the second circulation circuit of pressure step 3 pulp suspension is branched off from the junction of fiber sorting means 41, through the tube 52 and into the dewatering member 13 of the dewatering means 11', and suspension liquid pressed out through the perforations in the perforated member 13 (FIG. 2) of the dewatering means 11'0 is circulated back to the check valve 24 and from the check valve 24 through the communicating tube 54 and into the communicating tube 55 between the container 20 and the pump 21 on the suction side of the latter, whereby the suspension liquid circulated back from the dewatering means 11' becomes admixed, in the tube 55, with pulp suspension coming from the container 20. Identical circulation circuits are maintained for pressure steps 4 and 5 according to FIG. 1. Accordingly, at each of the pressure steps 3, 4 and 5 two circulation circuits are maintained by means of one circulation pump 21 only at each pressure step.

Figure 5G:
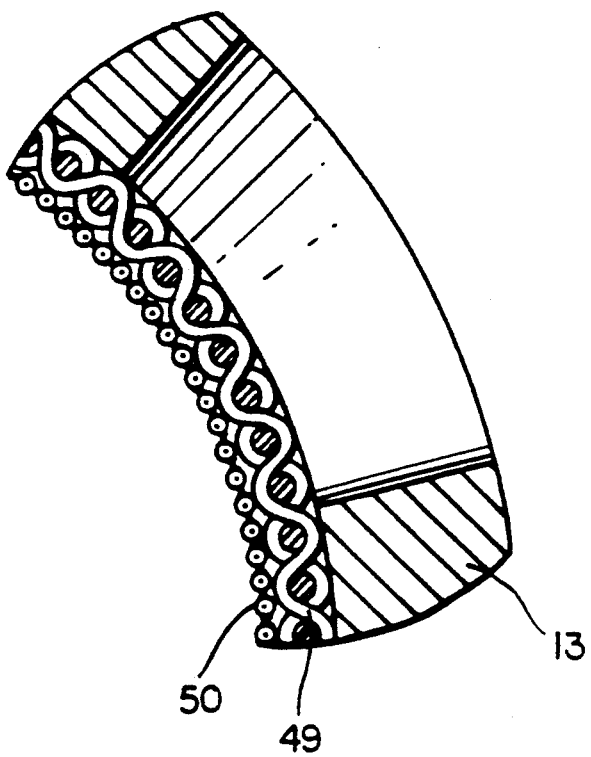
FIG. 5G is a closeup of the cross-sectional view shown in FIG. 5F.

FIG. 5 shows three examples of tube perforations, 46, 47 and 48 respectively, for the dewatering members 13 (FIG. 2) of the dewatering means 11, 11' and 11".

One or more layers of perforated material is attached to the inner wall of the tubular dewatering member 13 (FIG. 2), and the perforated material is preferably in the form of a thin, perforated metal sheet or foil, or in the form of a woven cloth of varying fineness and made of plastics or metal wires. In FIG. 5 section through the wall of the dewatering tubular member 13 with the perforation embodiment 48 has also been shown. A woven screen 49 is a relatively coarse screen made of wires capable of withstanding the overpressure within the dewatering tubular member 13, and a screen 50 is made of substantially thinner wires and has a denser fabric structure than that of the screen 49 and a substantial filtering capability with respect to retaining fibers from the pulp suspension on the filter screen. The two screens 49 and 50 are attached to the inner wall of the tubular dewatering member 13, the coarser screen 49 being closest to the inner wall of the tubular dewatering member 13.

Figure 6:
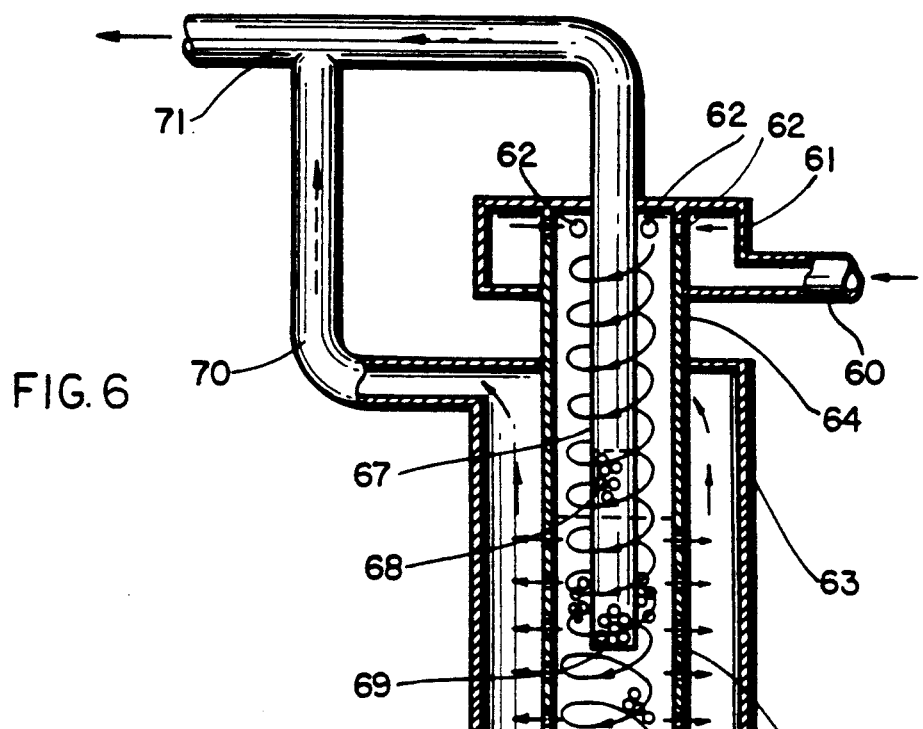
FIG. 6 shows an embodiment of a tubular, pressurized dewatering means according to the invention for use in carrying out the process of the invention.

FIG. 6 shows another embodiment of a tubular pressurized dewatering means used for carrying out the present process instead of or in combination with the dewatering means 11. The pressurized dewatering means shown in FIG. 6 is preferred for use in carrying out the present process compared with the use of the dewatering means 11. The dewatering means according to FIG. 6 is designed mainly as a hydrocyclone but contains additional elements which ensure a combined effect in the form of concurrent dewatering and separation of gas from fiber suspension introduced into the dewatering means, and in the dewatering means according to FIG. 6 concurrent cleaning of the perforated screen faces is carried out by continuously flushing the perforated screen faces with pulp suspension introduced into the dewatering means.

Pumping pressure and the design of the cyclone act in combination to set the pulp suspension introduced therein in rotation and/or turbulence. The dewatering takes place both radially outwardly through a perforated part 66 of a dewatering tube 64 (cyclone tube) and concurrently radially inwardly through a perforated part 68 of a tube 67 of smaller diameter than the tube 64 and arranged axially within the cyclone tube 64. Gas also separates form the suspension and escapes through the perforated part 68 of the inner tube 67, and the perforations of the tube part 66 and of the tube part 68 are kept clean by flushing new suspension continuously over the inner surface of the tube part 66 and the outer surface of the tube part 68.

Through a tube 60 (FIG. 6) pulp suspension is pumped into a distributing chamber 61 from which the pulp suspension is sprayed through openings 62 tangentially or radially into the dewatering tube 64 which according to FIG. 6 is partly enclosed by a tubular jacket 63. The tube 64 ends in a hollow cone 72 leading into an outlet tube 65 for dewatered and partly degasified pulp suspension.

Within the jacket 63 the tube part 66 of the tube 64 is perforated in the same manner as previously disclosed in connection with FIG. 5, and the inner surface of the perforated tube part 66 is provided with a thin perforated metal sheet and/or one or more layers 49, 50 (FIG. 5) of woven screens.

The perforated part 68 of the smaller tube 67 which is arranged within the tube 64 is also perforated in the same manner as disclosed above in connection with FIG. 5, however, with the perforated metal sheet or foil and/or woven screens being placed upon the outer surface of the tube part 68.

Because the pulp suspension introduced into the dewatering means according to FIG. 6 is caused to rotate and/or is set into turbulence within the dewatering tube 64, which near the introduction end of the pulp suspension into the dewatering means has a smooth inner surface, similarly to the outer surface of the unperforated part of the smaller tube 67, the heavier components of the pulp suspension, i.e. fibers and fiber fragments, collect preferentially along the inner surface of the perforated tube part 66.

Gas, e.g. oxygen, added to the pulp suspension preferably at or near the end of the pressurized tube pulping system, will due to the centrifugal forces set up within the dewatering means according to FIG. 6 preferentially collect about the outer surface of the inner tube 67 and will then together with suspension liquid escape through the perforations in the tube part 68 and into the tube 67. This mixture of suspension liquid and gas passes through the tube 67 and into a tube 71 which forms a continuation of the inner tube 67 from its end distant from its end 69, and in the tube 71 suspension liquid and gas from the tube 67 becomes admixed with suspension liquid which through a tube 70 escapes from the space between the tube 64, 66 and the surrounding jacket 63, and the combined suspension liquids flow through the tube 71 in a direction towards the beginning of the pulping process.

The dewatering means disclosed above in connection with FIG. 6 will automatically return gas, including mainly oxygen, added to the pulp suspension, throughout the entire process and countercurrently to the fiber flow. The gas is added at a high pressure level towards the end of the process and, accordingly, will automatically be carried towards increasingly lower pressure steps with steady expansion, which is a feature which, moreover, also ensures optimum influence from the gas and utilization of the gas during the process.

Thickened, dewatered pulp leaves the dewatering means according to FIG. 6 through the tube 65 and is conveyed to the inlet of the circulation pump 21 used for circulating fiber suspension back into said dewatering means.

The degree of perforation of the tube parts 66 and 68 of the tubes 64 and 67 respectively can vary independently upon one another, from no perforation to complete perforation of the entire tube surface, dependent upon the dewatering effect and separation effect desired for the pulp production in question. However, one of the tubes 64, 67 must always have a perforated part 66 respectively 68.

Figure 7:
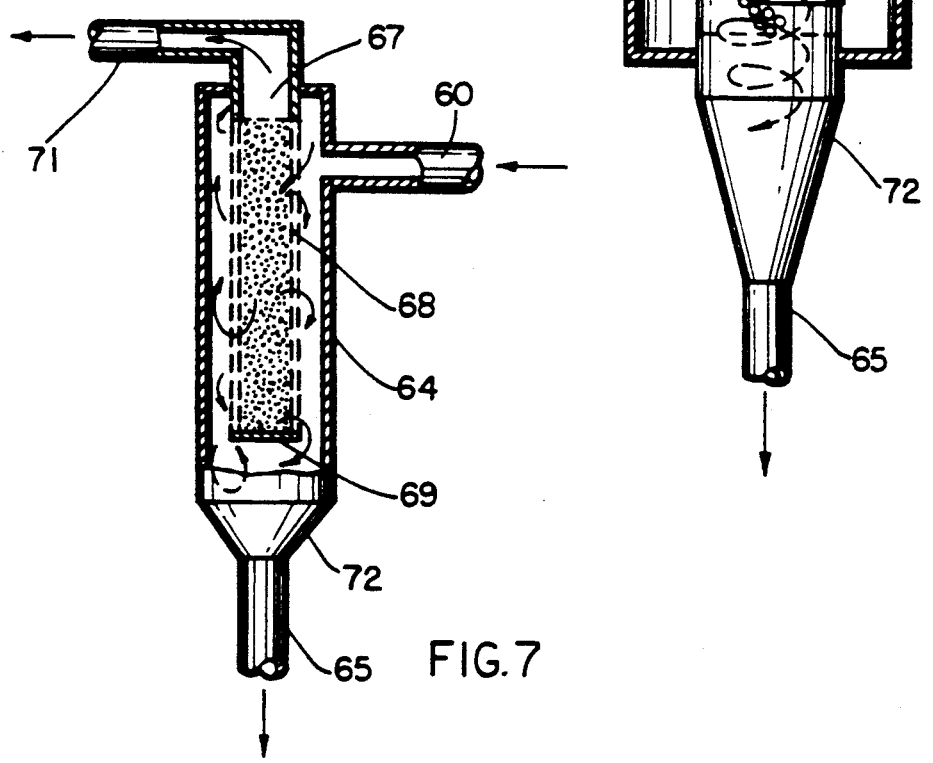
FIG. 7 shows another embodiment of the tubular pressurized dewatering means according to the invention.

If the inner tube 67 has no perforated part, its end 69 will be open. Gas from the suspension will then escape into the inner tube 67 through its open end 69, and the main part of the dewatering of the pulp will be effected due to liquid which will be removed form the pulp suspension through the perforations of the tube part 66. If on the other hand only the inner tube 67 is perforated (at 68), i.e. the outer tube 64 is not perforated, the outer jacket 63 becomes superfluous and may be deleted, and the outer tube 64 will then function as a jacket surrounding the inner tube 67, and gas and liquid will be removed from the pulp suspension solely through the perforations (at 68) in the inner tube 67 which then has its end 69 closed. Gas and liquid from the pulp suspension will be removed from the inner tube 67 near its open end opposite the closed end 69, and through the tube 71 the gas and liquid removed from the pulp suspension will be passed on to an upstream pressure step (lower pressure step) of the process. This embodiment of the dewatering means is shown in FIG. 7 wherefrom it appears that the jacket 63 according to FIG. 6 has been deleted and replaced by the outer tube 64 which is the unperforated. Essentially the whole of the inner tube 67 is perforated (at 68), and the end 69 of the inner tube 67 is closed.

When using metal sheets or foils as perforated screen for the dewatering tubes 64 and/or 67 the perforated metal sheet or foil has preferably been electrolytically produced and consists of pure metal, preferably nickel. When process chemicals are used which form complexes with nickel, e.g. ammonia, more noble metals are used.

The thickness of the foil can vary between 70 and 150 $\mu$m, and its distribution of perforations is preferably within the range from 120 to 200 mesh. In case of high demands to the screening efficiency a higher mesh range can be used.

The diameter of the perforations preferably varies between 30 and 120 $\mu$m dependent upon the type of fiber being processed and on production requirements.

Thus, the open area of the perforated metal foil preferably varies between 7 and 30% of the total screen surface.

When using textile fibers instead of perforated metal foil screens, synthetic fibers with opening distribution within the range from 115 to 230 mesh may be used, and the diameter of the synthetic wires may vary between 35 and 70 $\mu$m, which gives a mesh width within the range from 160 to 60 $\mu$m and an open area of 30 to 50%.

As support for the perforated metal foil or the textile fiber screen a screen woven of acid resistant wires may be used woven to a mesh number of from 10 to 20 mesh. The screen cloth again presses on a perforated tube of preferably acid resistant material, e.g. SIS 2343, through which holes have been drilled which have a diameter of from 7 to 20 mm, and which has then been electrolytically polished.

The jacket 63 around the perforated tube is preferably made of the same acid resistant material.

The other surfaces within the pressurized system which come into contact with liquids, e.g. in pumps, containers, screw (or piston) presses and tubes, are of conventional and known materials, adapted to the chemicals used, the wear occurring and the requirement to purity of the finished fiber product.

Figure 8:
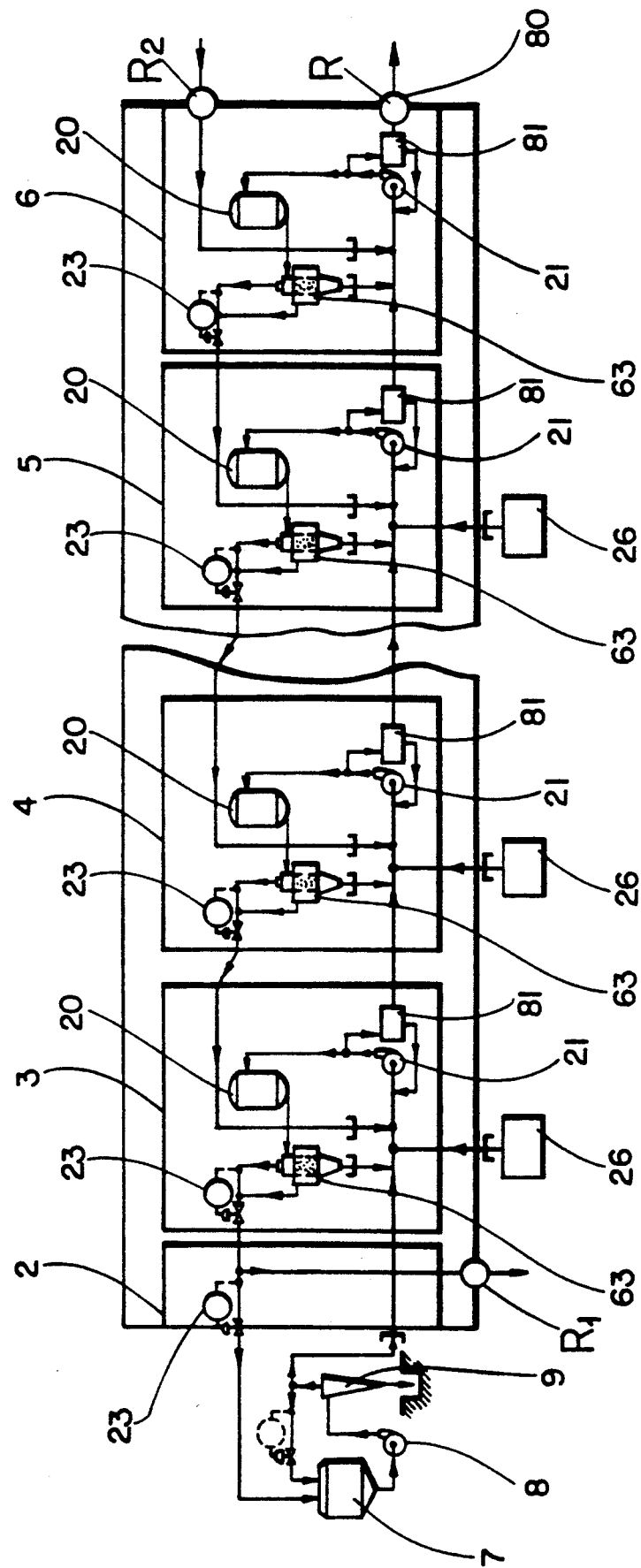
FIG. 8 shows another example of the closed pressurized tube system used for carrying out the present process and wherein the dewatering means according to the invention has been put to practical use.

FIG. 8 shows another embodiment of the pressurized tube pulping system used for carrying out the present process. According to FIG. 8 a dewatering means, identified by 63, of the type shown in FIG. 6 or FIG. 7 is used in each of the pressure steps 3, 4, 5 and 6, instead of the dewatering means 11, 11' and 11" shown in FIG. 1. Pulp suspension from a pulper 7 is again by means of a pulp pump 8 introduced into pressure step 2 through a cleaning means 9, and from pressure step 2 into pressure step 3 and into the circulation pump (pulp pump) 21. From the pulp pump 21 (pressure step 3) the pulp suspension is pumped into a container 20 and from the container 20 into the dewatering means 63. Liquid and gas separated from the pulp suspension in the dewatering means 63 are through a reducing or overflow valve 23 (PIC valve) returned to pressure step 2, and dewatered and thickened pulp suspension is removed from the dewatering means 63 through a check valve and is introduced into the pulp suspension tube leading from pressure step 2 into the circulation pump 21 of pressure step 3. From the communicating tube between the circulation pump 21 and the container 20 a tube is branched off which feeds pulp suspension into a dewatering device 81 used for obtained increased dewatering of the pulp suspension, and from the dewatering device 81 liquid pressed out therein is returned to the suction side of the circulation pump 21. The dewatering device 81 can consist of a pressurized screw press or pressurized piston press of known construction and mode of operation, and the dewatering device 81 has for that reason not been shown in details. Dewatered and thickened pulp suspension is from the dewatering device 81 conveyed to the next pressure step of the process, e.g. from pressure step 3 to pressure step 4, and in pressure step 4 becomes admixed, in the tube leading from the dewatering device 81 of pressure step 3 to the circulation pump 21 of pressure step 4, with dewatered pulp suspension coming from the dewatering means 63 through a check valve arranged in the communicating tube between the dewatering means 63 and the communicating tube between the dewatering device 81 of pressure step 3 and the circulation pump 21 of pressure step 4. Thus, in each of pressure steps 3, 4, 5 and 6 again two circulation circuits of pulp suspension are maintained by means of one circulation pump 21 only, i.e. dewatered pulp suspension coming from the dewatering means 63 into the circulation pump 21, from the circulation pump 21 into the container 20 and then back to the dewatering means 63, and a circulation circuit which consists of pulp suspension branched off from the communicating tube between the circulation pump 21 and the container 20 and fed into the dewatering device 81, and of pressed out suspension liquid returned from the dewatering device 81 to the suction side of the pump 21 and then into the pump 21.

By means of the embodiment shown in FIG. 8 the concentration of the fiber-containing suspension passed from pressure step to pressure step is substantially higher than when using the embodiment according to FIG. 1, and the number of process steps, i.e. pressure steps, when using the embodiment according to FIG. 8 can be kept correspondingly less for obtaining the same processing effect as when using the embodiment according to FIG. 1. According to FIG. 8, the amount of finished pulp discharged from the pressurized tube system is controlled by means of a mass control 80.

The fiber raw material is pulped in the pressurized tube system as previously disclosed in the above mentioned international application PCT/NO88/000111 with the formation of a pumpable alkaline suspension having a content of dry solids from 2 to 5%, preferably within the range of from 3 to 5%, or from 2.5 to 3.0%.

By means of the pump 8 (FIG. 1 and FIG. 8), the suspension is at constant pressure pumped through the cleaning system 9, then through the check valve 10 and into the pressurised system. The inlet pressure is controlled by means of a PIC valve 51 (FIG. 1).

In the pressurized tube system the fiber suspension is subjected to the first dewatering in the dewatering means 11 (FIG. 1) or 63 (FIG. 8) of pressure step 3. Specifically with reference to FIG. 1, in the dewatering means 11 which has been disclosed above in connection with FIG. 2, liquid of the suspension will due to the pressure drop penetrate through the perforations of the dewatering member 13 (FIG. 2) of the dewatering means 11 while using e.g. a perforation pattern for the dewatering member 13 as shown in FIG. 5.

The thickened pulp which is continuously formed within the dewatering member 13 (FIG. 2) by pressing process liquid out from the pulp suspension into the surrounding chamber 14, which pressed out process liquid from the surrounding chamber 14 passes out through the outlet tube 19, is diluted and flushed out of the dewatering member 13 by fiber suspension which by means of the pump 21 is pumped through the PIC valve 22 and into the dewatering means 11 through the inlet tube 18 thereof, whereupon the flushed out and thereby diluted pulp passes through the flushing chamber 16 and the outlet 17, into the container 20 and from the container through the tube 55 into the pump 21. Thus, the circuit for circulation of the fiber suspension at this pressure step, i.e. pressure step 3, consists of the inlet tube 18, the flushing chamber 16, the outlet 17, the container 20, the pump 21 and the PIC valve 22.

The branch tube 52 from the circulation circuit carries part of the fiber suspension which is circulating, on to the next dewatering means 11' in which the same type of dewatering takes place as in the preceding dewatering means 11, however, at a higher pressure level corresponding to the pressure of the pump 21 of pressure step 3.

Process liquid which has been pressed out in the dewatering means 11', as shown in FIG. 1, is returned to the check valve 24 (pressure step 3) arranged on the suction side of the pump 21, and from the check valve 24 the process liquid is introduced into the communicating tube 55 through which fiber suspension is transported from the container 20 to the pump 21. Thereby another circulation circuit is formed and maintained, and in this circuit mainly process liquid is circulated which has been pressed out in the dewatering means 11' and which at the suction side the pump 21 is introduced into the fiber suspension in the tube 55 coming from the container 20.

A possible excess of process liquid which has been pressed out in the dewatering means 11' will escape to a lower pressure step, i.e. pressure. step 2, through the overflow or reducing valve 23.

Heat in the form of steam, and chemicals, are from the supply means 26 pressed into the pressurized tube system through the check valve 25 into the communicating tube 55 from the container 20 to the pump 21.

The two circulation circuits maintained at each of pressure steps 3, 4 and 5 cause turbulence and more rapid chemical reactions within each pressure step compared with the process according to the above-mentioned international patent application. The pumps 21 will advance the fiber suspension through the process system wherein the fiber suspension is subjected to intermittent thickening with subsequent pulping and dilution of the thickened pulp.

Process liquid which has been pressed out in the dewatering means 11', 11" etc. is from the dewatering means returned to the check valve 24 and thence through the tube 54 into the tube 55 (FIG. 1) and in the tube 55 becomes admixed with fiber suspension which is kept circulating in the fiber suspension circuit by means of the pump 21 and from which the fiber suspension dewatered in the dewatering means 11', 11" has been branched off. Part of, i.e. the excess of, process liquid pressed out in the dewatering means 11', 11", is fed back to the next preceding and lower pressure level through the controlled overflow valve 23. Thereby the total amount of process liquid pressed out in the dewatering means will, after circulation at different pressure steps, flow back towards the beginning of the process, countercurrent to the fiber flow, and, moreover, as further disclosed in the above-mentioned international application which is incorporated herein by reference.

In the above-mentioned international application also several methods for discharging thickened pulp from the last pressure step of the pressurized system are disclosed. The methods and the discharge means disclosed therein can also be used for the system according to the attached FIG. 1 and the subsequent process means.

Figure 3:
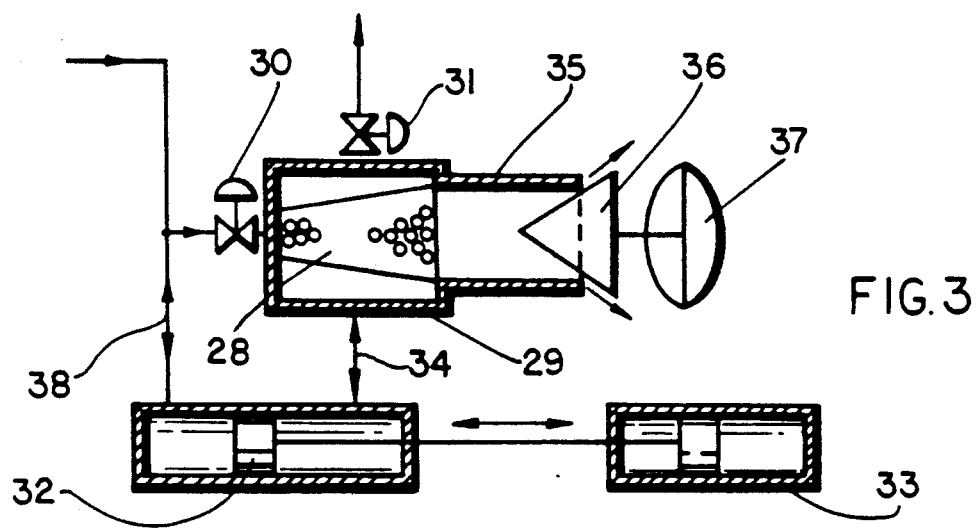
FIG. 3 shows another embodiment of a dewatering means for carrying out the present process.

However, in FIG. 1 also a new design for a discharge means has been shown. In contrast to the dewatering means disclosed in the international application referred to above this discharge means operates discontinuously and in response to the movements of the hydraulic piston 32. The stroke of the piston and thereby the amount of liquid flushed back through the perforations 28 in the conical tube (FIG. 3) will be determined by how far it is desired for each piston movement to move the pulp plug formed forward and through the tube 35 towards the outlet means proper which can be comprised by a pressure loaded splitting cone 36, as shown in FIG. 1 and FIG. 3, or by a plate which is pressed against the outlet opening (not shown in the drawing). According to FIG. 8, however, the discharge means is a screw press or piston press 81 which thickens the pulp suspension before discharging the pulp from the pressurized system.

The valves in the tubes for circulation of liquids and return of liquids and shown in FIG. 1 and FIG. 8 are pressure operated automatic valves which open at a preset pressure. Because the pressure increase when carrying out the present process takes place in steps or stages, these valves will automatically adjust the back flow of process liquid through the process and thereby the counter-flow between fiber flow and process liquid and, with respect to amounts, determined by the amount of liquid (e.g. water) which is pressed into the last step of the process through the regulator $R_2$.

The amount of fresh liquid added (through $R_2$) will also determine the amount of spent process liquid which is discharged from the system (through $R_1$, FIG. 1 and 8) and thereby also the concentration of solids in the spent process liquid.

The pressure controlled automatic valves 22, 23 between the various stages of increasing pressure shown in FIG. 1 and 8 will besides providing for automatic control of the back-flow of process liquid through the process and thereby the counter-flow between fiber flow and process chemicals also control the back pressure and thereby the pressure drop across the pressurized dewatering devices, i.e. the pressure controlled valves will provide for control of the degree of dewatering or the amount of liquid pressed out of the pulp slurry.

Some examples of chemical process conditions for the present process when the present process comprises cooking, washing, bleaching and washing, have been given in the below Table I.

TABLE I

Chemical process conditions, including operation temperature and time, for the Tube Pulping System

| | Fiber flow | | | | | | |
|---|---|---|---|---|---|---|---|
| | Delignification (plus optionally deinking) Pulping (cooking, digesting) temperature, chemicals and time | | | | | Washing | |
| Raw material | Temp. °C. | NaOH others %[1] | $O_2$ % | $AQ^{3)}$ others % | Time, min. | Temp., °C. | Time, min. |
| Second, fiber | | | | | | | |
| Occ | 90–130 | 1–10 | 1–8 | — | 5–40 | 70–120 | 0.5–10 |
| Old news | 90–130 | 1–10 | 1–8 | — | 5–40 | 70–120 | 0.5–10 |
| Old printing | 70–130 | 1–10 | 0–8 | — | 2–40 | 70–120 | 0.5–10 |
| Annual plants | | | | | | | |
| Straw (wheat, rice) | 100–140 | 5–15 | 2–15 | 0,0005 | 10–60 | 70–140 | 0.5–10 |
| Bagasse | 100–140 | 5–15 | 2–15 | " | 10–60 | 70–140 | 0.5–10 |
| Fruit waste ("bunches") | 100–140 | 5–15 | 2–15 | " | 10–60 | 70–140 | 0.5–10 |
| Saw dust[2] | 100–150 | 5–20 | 5–15 | " | 10–90 | 70–140 | ca. 3 |
| Softwood[2] | 110–150 | 5–20 | 5–15 | " | 20–90 | 90–120 | " |
| Hardwood[2] | 110–150 | 5–20 | 5–15 | " | 20–90 | 90–120 | " |

| | Liquid flow | | | | | | | |
|---|---|---|---|---|---|---|---|---|
| | Bleaching temperature, chemicals and time | | | | | | Washing | |
| Raw material | Temp., °C. | $Cl_2$, % | $O_2$, % | NaOH % | Peroxide % | $O_3$ % | Time, min. | Temp., °C. | Time, min. |
| Second, fiber | | | | | | | | |
| Occ | 70–120 | 0–6 | 0–3 | 0–5 | 0–3 | 0–5 | 0.5–40 | 70–120 | 0.5–10 |
| Old news | 70–120 | 0–6 | 0–3 | 0–5 | 0–3 | 0–5 | 0.5–40 | 70–120 | 0.5–10 |
| Old printing | 70–120 | 0–6 | 0–3 | 0–5 | 0–3 | 0–5 | 0.5–40 | 70–120 | 0.5–10 |
| Annual plants | | | | | | | | |
| Straw (wheat, rice) | 70–120 | 0–6 | 0–3 | 0–5 | 0–3 | 0–5 | 0.5–40 | 70–120 | 0.5–10 |
| Bagasse | 70–120 | 0–6 | 0–3 | 0–5 | 0–3 | 0–5 | 0.5–40 | 70–120 | 0.5–10 |
| Fruit waste ("bunches") | 70–120 | 0–6 | 0–3 | 0–5 | 0–3 | 0–5 | 0.5–40 | 70–120 | 0.5–10 |
| Saw dust[2] | 70–120 | 0–6 | 0–3 | 0–5 | 0–3 | 0–5 | 0.5–40 | 70–120 | 0.5–10 |
| Softwood[2] | 90–120 | 0–6 | 0–3 | 0–5 | 0–3 | 0–5 | 0.5–40 | 70–120 | 0.5–10 |
| Hardwood[2] | 90–120 | 0–6 | 0–3 | 0–5 | 0–3 | 0–5 | 0.5–40 | 70–120 | 0.5–10 |

[1]Other bases, e.g. ammonia
[2]With in-line mechanical defibration
[3]AQ (anthraquinone) and surfactants, like surface active deinking agent, in small amounts It appears from Table I that when cooking a temperature varying from 90° to 150° C. is used, dependent upon the fiber material fed in, and as cooking chemicals sodium hydroxide or ammonia, oxygen and, optionally, auxiliary cooking adjuvants, like anthraquinone (AQ), are used. The total cooking period varies from 10 to 90 minutes dependent upon the fiber material supplied, however, a satisfactory delignification with optional deinking of secondary fiber will take place in the course of from 2 to 40 minutes.

The bleaching is carried out in alkaline environment using chlorine, $O_2$, peroxide (oxygen bleaching) or $O_3$, and the temperature during the bleaching is maintained between 70° and 120° C. The washing between the cooking and the bleaching can be carried out at a temperature of from 70° to 140° C., and the washing time can vary from 0.5 to 10 minutes. Subsequent to the bleaching a final washing is carried out. It appears from Table I that all the time fiber flow and liquid flow are conveyed in opposite directions to each other. Because the entire process takes place within an integrated, closed and pressurized tube system ammonia is also suited as cooking chemical. Thus, the system underlying the present process can be termed "The Tube Pulping System" or abbreviated the "TPS process".

During the progress of the process the pumps 21 effect recirculation and reuse of digesting liquid and chemicals and, moreover, mixing and dispersing of added fresh amounts of chemicals and gas to the digesting liquid, stirring and thereby a strong "washing machine effect" within the system and, moreover, optimum utilization of heat and chemicals.

The countercurrent principle utilized for carrying out the present TPS process enables deinking of secondary fiber from various print qualities to be carried out without having to resort to extra mechanical additional equipment. The deinking which is enhanced by particular chemicals added to the process takes place in the pulp prior to or at the same time as the pulp arrives for delignification and, if desired, to be subsequently bleached. A suitable chemical in order to enhance the deinking is a non-ionic surface active nonylphenol alkylene oxide adduct.

By means of the present process also-so called "explosion pulp" can be produced by causing the pulp to leave the pressurized system without preceding cooling of the liquid-fiber mixture to a temperature below 100° C. before discharging it to atmospheric pressure. In this context the uniqueness of the present process is that it also enables "explosions" of pulp from for example relatively elevated pressures of from 15 to 20 bar (dependent upon the number of circulation pump in the system) and at relatively low temperature in the pressurized system, i.e. from 110° to 150° C., because pressures and temperatures used for the TPS process can be selected independently of one another, i.e. in contrast to conventional pulp production where pressure and temperature are determined by the conventionally used saturated steam. The advantage of combining low temperatures and high pressures during the present process is that the pulp will than be subject to a more mild chemical treatment compared with what the case would have been had the extremely elevated temperatures corresponding to temperatures of saturated steam at such elevated pressures as from 15 to 20 bar been used. The high pressures used in the present process ensure high effect of gaseous additives supplied to the process.

The pressure increase against which each circulation pump in series must work, i.e. the pressure increase of each pumping step, may be within the range from 0.5 to 10 bar, preferably not above 5 bar.

The process embodiment according to FIG. 8 is preferred to that according to FIG. 1 with the dewatering means according to FIG. 7 being preferably used as dewatering means 63 according to FIG. 8.

I claim:

1. A process for delignification of virgin fibres selected from the group consisting of coniferous wood, deciduous wood and annual plants, and for delignification of secondary fibers from waste paper and board made of chemical or mechanical pulp, and for the production of a pulp suitable as fibrous feedstock for the manufacture of paper and board from the delignified fiber, the method comprised of introducing said fibers into a delignification zone and are delignified therein in an alkaline slurry at elevated temperature and pressure using, as a basic main chemical, an alkaline cooking chemical in combination with oxygen, and wherein waste liquid resulting from reaction between said fibers and said cooking chemicals is removed from the delignification process in the form of a black liquor, wherein said fibers in the form of a pumpable slurry thereof during the delignification of the fibers are conveyed through a delignification zone consisting of a closed, continuous and pressurized tube system by means of centrifugal circulation pulp pumps which are simultaneously used as mixing apparatus for the slurry and the chemicals, the slurry while being conveyed through the tube system being subjected to stepwise increasing pressure in at least three separate pumping steps and being repeatedly subjected to dewatering and pressing out of liquid therefrom within said tube system, and prior to each dewatering of the process, apart from the last dewatering of the process, said slurry is diluted with liquid which has been pressed out of the slurry within said tube system in a downstream step of the process, with regard to fiber flow and recycled from said dewatering, and immediately prior to the last dewatering of the process the dewatered and thickened fiber-containing slurry is diluted with a liquid selected from the group consisting of fresh water, bleach liquor or a mixture of the two, said liquid being supplied under pressure into said pressurized tube system through an inlet at the end of said delignification zone, and after the last dewatering of the process the thickened slurry in the form of a pulp is washed in a continuation of the pressurized tube system, and wherein at least at each pressure step of the process intermediate the first and last pressure step, first and second circulation circuits are maintained by and circulate through the same circulation pump, the first of the circulation circuits being comprised mainly of fiber-containing slurry in circulation and the second circulation circuit being comprised mainly of process liquid pressed out of the fiber containing slurry downstream of the fiber flow, dewatering and thickening the fiber containing slurry by branching off part of the fiber containing slurry circulating in said first circulation circuit, and introducing said branched off part into a downstream dewatering-thickening means to form a dewatered and thickened fiber-containing slurry, and returning the process liquid removed from the fiber-containing slurry in said downstream dewatering-thickening means to a suction side of the circulation pump and at said suction side being admixed with fiber-containing slurry circulated in said first circulation circuit, passing the dewatered and thickened fiber-containing slurry from said dewatering-thickening means into the circulation pump of the next succeeding pressure step and admixing at the suction side of said pump the thickened fiber-containing slurry from said downstream dewatering-thickening means with process liquid pressed out in a dewatering-thickening means of said next succeeding pressure step of higher pressure, and branching off part of said mixture of thickened fiber-containing slurry and pressed out process liquid from said pump of said next succeeding higher pressure step, introducing said branched off part of said mixture into a dewatering-thickening means in said next succeeding higher pressure step in which the mixture of thickened fiber-containing slurry and pressed out process liquid is concurrently dewatered and degasified, and returning the mixture of gas and liquid removed from said mixture in said dewatering-thickening means to the next preceding pressure step of lower pressure for admixture into the thickened fiber-containing slurry in said next preceding pressure step at the suction side of the pulp pump of said next preceding pressure step.

2. A process as claimed in claim 1, wherein the circulation circuits are maintained at each pressure step apart from the first pressure step of the process.

3. A process as claimed in claim 1, wherein the dewatered and thickened fiber-containing slurry formed in said dewatering thickening means is discharged from said dewatering means to form said one circulation circuit comprised mainly by fiber-containing slurry in the next succeeding pressure step of higher pressure in the process.

4. A process as claimed in claim 1 wherein the fiber-containing slurry is both dewatered and degasified in the dewatering means.

5. Process as claimed in claim 1, wherein secondary fibers from waste paper and board made of chemical or mechanical pulps are subjected to deinking prior to the delignification thereof using an apparatus assembly as used for the delignification.

6. Process as claimed in claim 1 wherein the fibers are subjected to bleaching after the delignification thereof using an apparatus assembly as used for the delignification.

7. Process as claimed in claim 1, wherein the basic main chemical is used in combination with minor amount of other adjuvants.

8. Process as claimed in claim 7 wherein said other adjuvants include anthraquinone.

9. Process as claimed in claim 6, wherein the delignification is a digestion and the digested fibers are bleached in an apparatus assembly comprising pulp pumps and dewatering-thickeners as used for the digestion of the fibers.

* * * * *